(12) United States Patent
Spagnola et al.

(10) Patent No.: US 11,111,410 B2
(45) Date of Patent: Sep. 7, 2021

(54) DUAL CURE SOFT TOUCH COATINGS

(71) Applicant: Arkema France, Colombes (FR)

(72) Inventors: Lisa Marie Spagnola, Richboro, PA (US); Jeffrey Klang, West Chester, PA (US); Manjuli Gupta, Easton, PA (US)

(73) Assignee: Arkema France, Colombes (FR)

( * ) Notice: Subject to any disclaimer, the term of this patent is extended or adjusted under 35 U.S.C. 154(b) by 73 days.

(21) Appl. No.: 16/081,086

(22) PCT Filed: Feb. 21, 2017

(86) PCT No.: PCT/EP2017/053900
§ 371 (c)(1),
(2) Date: Aug. 30, 2018

(87) PCT Pub. No.: WO2017/148742
PCT Pub. Date: Sep. 8, 2017

(65) Prior Publication Data
US 2019/0092967 A1    Mar. 28, 2019

Related U.S. Application Data

(60) Provisional application No. 62/302,286, filed on Mar. 2, 2016.

(51) Int. Cl.
| | |
|---|---|
| *C08F 2/46* | (2006.01) |
| *C08F 2/50* | (2006.01) |
| *C08G 61/04* | (2006.01) |
| *C09D 175/16* | (2006.01) |
| *C08G 18/81* | (2006.01) |
| *C08L 75/16* | (2006.01) |
| *C08G 18/67* | (2006.01) |
| *C08G 18/42* | (2006.01) |
| *C08G 18/62* | (2006.01) |

(52) U.S. Cl.
CPC ........... *C09D 175/16* (2013.01); *C08G 18/42* (2013.01); *C08G 18/6254* (2013.01); *C08G 18/67* (2013.01); *C08G 18/672* (2013.01); *C08G 18/6795* (2013.01); *C08G 18/81* (2013.01); *C08G 18/8175* (2013.01); *C08L 75/16* (2013.01)

(58) Field of Classification Search
CPC ...... C09D 175/16; C08G 18/81; C08G 18/42; C08G 18/6254; C08G 18/6795; C08G 18/8175; C08G 18/672; C08G 18/67; C08L 75/16
USPC ........................................... 522/90, 1; 520/1
See application file for complete search history.

(56) References Cited

U.S. PATENT DOCUMENTS

| | | |
|---|---|---|
| 6,335,381 B1 | 1/2002 | Hovestadt et al. |
| 6,465,539 B1 | 10/2002 | Weikard et al. |
| 2004/0006152 A1 | 1/2004 | Weikard et al. |
| 2004/0097611 A1 | 5/2004 | Nienhaus et al. |
| 2005/0245711 A1 * | 11/2005 | Narayan-Sarathy ........................ C08G 18/672 526/302 |
| 2016/0145449 A1 * | 5/2016 | Hilgers .................... C09D 4/06 428/327 |

FOREIGN PATENT DOCUMENTS

| | | | |
|---|---|---|---|
| CN | 103237606 A | 8/2013 | |
| CN | 104830218 A | 8/2015 | |
| DE | 000019944156 | * 9/1999 | |
| DE | 20 2012 012 632 U1 | 1/2012 | |
| JP | 61249615 A2 | 11/1986 | |
| WO | WO2012/089827 A1 | 7/2012 | |
| WO | WO-2014207103 A1 * | 12/2014 | ............... C09D 5/00 |

OTHER PUBLICATIONS

Weikard et al, DE000019944156 Machine Translation, Sep. 15, 1999 (Year: 1999).*

* cited by examiner

*Primary Examiner* — Jessica Whiteley
(74) *Attorney, Agent, or Firm* — Christopher R. Lewis

(57) ABSTRACT

Coatings having a favorable combination of "soft touch" characteristics and durability are obtained by dual curing compositions containing free radical-curable ethylenically unsaturated compound(s), polyol(s) and polyisocyanate(s).

30 Claims, No Drawings

DUAL CURE SOFT TOUCH COATINGS

CROSS-REFERENCE TO RELATED APPLICATIONS

This application is a U.S. national stage application under 35 U.S.C, § 371 of PCT/EP2017/053900, filed Feb. 21, 2017, which claims the benefit of U.S. patent application No. 62/302,286, filed Mar. 2, 2016.

FIELD OF THE INVENTION

The present invention relates to curable compositions useful for forming durable coatings having a soft touch or feel on substrate surfaces, as well as methods for making such curable compositions and cured coatings.

BACKGROUND OF THE INVENTION

Products with a soft feel coating or soft touch coating are desirable, as such coatings provide a more pleasing, luxurious feel to plastic, metal or other hard substrates. Conventional soft feel coatings have been based upon solvent- or water-borne two-part systems with isocyanate-based chemistry. While such coatings are advantageous with respect to feel, such coatings suffer from drawbacks including difficulties in formulating, limited shelf-life, long curing times and poor protective properties such as stain, chemical, abrasion and mar resistance. Consequently, it would be desirable to improve such coatings, in particular to enhance their protective properties while at the same time maintaining their advantageous haptic attributes. Such objectives have proven to be challenging to achieve, since changes in the formulation of such two part isocyanate systems which increase certain properties of the cured coatings obtained therefrom, such as resistance to staining, chemicals and abrasion, generally tend to compromise the soft feel of the coatings.

Representative examples of coating formulations known in the art may be summarized as follows:

DE 202012012632 discloses a UV-curable soft feel coating for pen grips. In the examples, this publication is directed to a soft feeling coating obtained using a mixture of difunctional oligomer and monofunctional monomer that is radiation curable.

JP 5000123 discloses the synthesis of a urethane acrylate oligomer which is capable of being used to create a radiation-curable coating.

CN 104830218 discloses a mixture of polyester and acrylic resin, which is mixed with free isocyanate. The mixture is sprayed onto a substrate and then cured thermally.

WO 2012089827 discloses blends of polyols and isocyanates that form a non hydrolyzable soft feel coating after being thermally cured.

Further improvements in soft feel coating technology would be of great interest, in particular the development of coatings which are highly durable (e.g., more resistant to staining, abrasion, chemicals and so forth than conventional urethane-based coatings) and yet have haptic properties comparable to those obtained using conventional urethane-based coatings.

SUMMARY OF THE INVENTION

It has now been discovered that combining at least one free radical-curable ethylenically unsaturated compound with at least one polyisocyanate and at least one polyol provides a coating composition that, when cured by both the reaction of polyol and polyisocyanate and by free radical polymerization, has improved protective properties as compared to the protective properties of a coating obtained by curing the at least one polyisocyanate and at least one polyol in the absence of the at least one free radical-curable ethylenically unsaturated compound. However, the incorporation of the free radical-curable ethylenically unsaturated compound does not significantly affect the desirable haptic attributes of the cured coating. That is, the desirable "soft touch" or "soft feel" characteristics of a cured coating based solely on urethane (the reaction product of polyisocyanate and polyol) are substantially retained, despite the presence of the free radical-curable ethylenically unsaturated compound. This result was unexpected, since increasing the durability of a cured urethane-based coating through, for example, additional crosslinking typically has an adverse effect on the coating's haptic properties (i.e., the cured coating feels less soft and not as pleasing to the touch).

Without wishing to be bound by theory, it is believed that utilizing one or more free radical-curable ethylenically unsaturated compounds in the coating composition may lead to the production of a coating that, once cured, has a higher degree of crosslinking than an analogous coating prepared from a coating composition that does not contain such compounds and that such crosslinking may be responsible for the enhanced durability of coatings prepared in accordance with the invention. Normally, increased crosslinking of a polymer composition lessens the soft feel of the cured composition; the finding by the inventors of the present invention that the inclusion of ethylenically unsaturated compound(s) in a coating composition does not adversely impact haptic properties was therefore surprising.

The present invention also addresses the processing problems often encountered when using urethane-based "soft touch" coating compositions. In conventional practice, a two part urethane coating composition is obtained by combining a first part comprised of polyol and a second part comprised of polyisocyanate. The coating composition thereby obtained is applied to the surface of a substrate. Although, the polyol and polyisocyanate generally start to react to form urethane as soon as the two parts are combined, full curing (hardening) of the coating usually requires prolonged baking at an elevated temperature. Thus, prior to baking, the coating is susceptible to marring and to contamination (e.g., dust may stick to the tacky surface of the uncured/partially cured coating). In accordance with the present invention, the intermediate properties of the coating may be improved by carrying out a radiation or other free radical cure of the coating composition containing free radical-curable ethylenically unsaturated compound, polyol and polyisocyanate, after the composition has been applied to a substrate surface but prior to baking. This procedure advantageously provides a faster process for achieving a preliminary dust- and mar-resistant coating surface prior to achieving full cure of the composition than is possible using conventional two part urethane coating technology.

Various suitable, non-limiting examples of embodiments in accordance with the present invention may be described as follows:

1. A coating composition comprised of, consisting essentially of or consisting of at least one free radical-curable ethylenically unsaturated compound, at least one polyol and at least one polyisocyanate.

2. The coating composition of embodiment 1, wherein the at least one free radical-curable ethylenically unsaturated compound includes at least one compound having one or more functional groups selected from the group consisting of vinyl (e.g., allyl) groups, acrylate groups, methacrylate groups and combinations thereof.
3. The coating composition of embodiment 1 or 2, wherein the at least one free radical-curable ethylenically unsaturated compound includes at least one isocyanurate tri (meth)acrylate or derivative thereof.
4. The coating composition of any one of embodiments 1-3, wherein the at least one free radical-curable ethylenically unsaturated compound includes at least one urethane diacrylate.
5. The coating composition of any one of embodiments 1-4, wherein the at least one free radical-curable ethylenically unsaturated compound includes at least one isocyanurate tri(meth)acrylate or derivative thereof and at least one urethane diacrylate.
6. The coating composition of any one of embodiments 1-5, wherein the at least one ethylenically unsaturated compound includes at least one isocyanate functionality-containing urethane acrylate.
7. The coating composition of any one of embodiments 1-6, wherein the at least one free radical-curable ethylenically unsaturated compound includes at least one isocyanate-reactive functionality-containing (meth)acrylate.
8. The coating composition of any one of embodiments 1-7, additionally comprising at least one photoinitiator.
9. The coating composition of any one of embodiments 1-8, additionally comprising at least one free radical initiator that decomposes when heated or in the presence of an accelerator.
10. The coating composition of any one of embodiments 1-9, additionally comprising at least one matting agent.
11. The coating composition of any one of embodiments 1-10, additionally comprising at least one non-reactive solvent.
12. The coating composition of any one of embodiments 1-10, wherein the coating composition is free of non-reactive solvent.
13. The coating composition of embodiments 1-10 or 12, wherein the coating composition is water-borne.
14. The coating composition of any one of embodiments 1-13, wherein the at least one polyol includes one or more polyols selected from the group consisting of polyester polyols, polyether polyols, polycarbonate polyols, polycarbonate polyester polyols, polyacrylic polyols, polyurethane polyols, polycaprolactone polyols, polyolefin polyols and combinations thereof.
15. The coating composition of any one of embodiments 1-14, wherein the at least one polyisocyanate includes one or more polyisocyanates selected from the group consisting of aromatic polyisocyanates, aliphatic polyisocyanates and cycloaliphatic polyisocyanates.
16. The coating composition of any one of embodiments 1-15, wherein the weight ratio of (polyol+polyisocyanate):free radical-curable ethylenically unsaturated compound is from 1:1 to 10:1.
17. The coating composition of embodiment 1, wherein the coating composition is comprised of, consists essentially of or consists of at least one polyol, at least one polyisocyanate, at least one non-reactive solvent, at least one urethane diacrylate, at least one isocyanurate tri(meth) acrylate, at least one matting agent and at least one photoinitiator.
18. The coating composition of embodiment 1, wherein the coating composition is comprised of, consists essentially of, or consists of at least one polyol, at least one polyisocyanate, at least one non-reactive solvent, at least one isocyanate functionality-containing urethane acrylate, at least one matting agent and at least one photoinitiator.
19. The coating composition of any one of embodiments 1-18, wherein the coating composition is packaged in the form of two separate parts as follows:
a-1) a Part A-1 comprised of, consisting essentially of or consisting of at least one free radical-curable ethylenically unsaturated compound and at least one polyisocyanate; and
b-1) a Part B-1 comprised of, consisting essentially of or consisting of at least one polyol; or
a-2) a Part A-2 comprised of, consisting essentially of or consisting of at least one free radical-curable ethylenically unsaturated compound and at least one polyol; and
b-2) a Part B-2 comprised of, consisting essentially of or consisting of at least one polyisocyanate.
In such embodiments, it will be preferred for polyol and polyisocyanate to be packaged separately (e.g., Part A-1 does not contain polyol, Part B-1 does not contain polyisocyanate, Part A-2 does not contain polyisocyanate, Part B-2 does not contain polyol).
20. A method of forming a coating on a surface of a substrate, comprising the steps of applying at least one layer of the coating composition of any of embodiments 1-19 to the surface of the substrate, exposing the coating composition to an amount of radiation and/or heat effective to initiate cure of the at least one free radical-curable ethylenically unsaturated compound and reacting the at least one polyol and the at least one polyisocyanate.
21. The method of embodiment 20, wherein the coating composition is prepared by mixing a first part comprised of, consisting essentially of or consisting of the at least one free radical-curable ethylenically unsaturated compound and the at least one polyol with a second part comprised of, consisting essentially of or consisting of the at least one polyisocyanate or by mixing a first part comprised of, consisting essentially of or consisting of the at least one polyol and a second part comprised of the at least one polyisocyanate and the at least one free radical-curable ethylenically unsaturated compound.
22. The method of embodiment 20 or 21, wherein the coating composition is heated after being applied to the surface of the substrate.
23. The method of any one of embodiments 20-22, wherein the coating composition is heated after exposing the coating composition to the amount of radiation effective to initiate cure of the at least one free-radical curable ethylenically unsaturated compound.
24. The method of any one of embodiments 20-22, wherein the coating composition is exposed to the amount of radiation effective to initiate cure of the at least one free-radical curable ethylenically unsaturated compound after heating the coating composition.
25. A precursor composition useful for forming a coating composition when combined with at least one polyol, wherein the precursor composition is comprised of, consists essentially of or consists of at least one free radical-curable ethylenically unsaturated compound and at least one polyisocyanate. Such precursor composition may be free of any polyol.
26. A precursor composition useful for forming a coating composition when combined with at least one polyisocyanate, wherein the precursor composition is comprised of, consists essentially of or consists of at least one free radical-curable ethylenically unsaturated compound and at least one polyol. Such precursor composition may be free of any polyisocyanate.

27. A two part system useful for forming a coating composition, comprising, consisting essentially of or consisting of, as separately packaged components, either:
   a-1) a Part A-1 comprised of, consisting essentially of or consisting of at least one free radical-curable ethylenically unsaturated compound and at least one polyisocyanate; and
   b-1) a Part B-1 comprised of, consisting essentially of or consisting of at least one polyol; or
   a-2) a Part A-2 comprised of, consisting essentially of or consisting of at least one free radical-curable ethylenically unsaturated compound and at least one polyol; and
   b-2) a Part B-2 comprised of, consisting essentially of or consisting of at least one polyisocyanate.
   In such embodiments, it will be preferred for polyol and polyisocyanate to be packaged separately (e.g., Part A-1 does not contain polyol, Part B-1 does not contain polyisocyanate, Part A-2 does not contain polyisocyanate, Part B-2 does not contain polyol).
28. A method of making a coating, comprising, consisting essentially of or consisting of combining Part A-1 and Part B-1 of embodiment 27 or combining Part A-2 and Part B-2 of embodiment 27 to form a coating composition, applying the coating composition to a surface of a substrate and curing the applied coating composition.
29. A coating comprised of, consisting essentially or consisting of at least one layer of a coating composition in accordance with any one of embodiments 1-19, wherein the coating composition is cured.
30. An article of manufacture comprised of a substrate, wherein a surface of the substrate is at least partially coated with a coating composition in accordance with any one of embodiments 1-19.
31. The article of manufacture of embodiment 30, wherein the surface of the substrate is comprised of at least one material selected from the group consisting of thermosets, thermoplastics, metals, wood, leather, glass, paper, cardboard and combinations thereof.
32. Use of a composition of any one of embodiments 1 to 19, in dual cure soft touch coatings and/or films, in particular coatings and/or films for automobiles and other motor vehicles such as coatings on armrests, dashboards, seating, switches, controls and other interior components, aeronautic components, small appliances, packaging such as cosmetics packaging, printing enhancements (inks), coatings on leathers and synthetic leathers and/or consumer electronics.

DETAILED DESCRIPTION OF THE INVENTION

In certain embodiments, the present invention provides a dual cured coating composition wherein a free radical-curable ethylenically unsaturated component (e.g., one or more (meth)acrylate-functionalized monomers and/or oligomers) is blended with a two part urethane (a first part containing one or more polyols and a second part containing one or more polyisocyanates). Such compositions may be referred to as "dual cured" or "dual curable", due to the two modes of curing which take place during formation of a cured coating having a desirable combination of durability and haptic ("soft touch") properties: curing of the polyol(s) and polyisocyanate(s) and curing of the ethylenically unsaturated compound(s) due to free radical polymerization or other reaction involving the ethylenically unsaturated compounds. A coating of the composition may be applied to a surface of a substrate at ambient temperature or near ambient temperature, such as in the range of 10-35° C. Once applied, the composition may be dual cured, using both free radical curing and reacting hydroxyl groups of the polyol with isocyanate groups of the polyisocyanate in a urethane reaction (which may be promoted by catalysts and/or heating at an elevated temperature). Free radical curing techniques are not particularly limited and may include techniques that expose the coating composition to polymerization accelerants. Such techniques may include exposure to radiant energy such as visible radiation, UV radiation and LED radiation or exposure to electron-beam radiation or exposure to chemicals (e.g., free radical initiators that decompose when heated or in the presence of accelerator). The urethane reaction may be conducted at room temperature but preferably is carried out and/or completed at least in part at elevated temperatures. Exemplary, non-limiting reaction conditions for the urethane reaction are time periods ranging from 15 minutes to 75 minutes at temperatures ranging from 50° C. to 80° C.

Once a coating of dual curable composition is applied, for example, to a substrate, the coating may be cured both by free radical polymerization and by reaction of the hydroxyl- and isocyanate-functionalized components of the composition (a two part urethane reaction). Success of the dual cure process involving free radical curing and a two part urethane reaction is not order dependent; however, utilizing free radical polymerization (curing) first may impart sufficient surface cure to produce an intermediate coating with sufficient dust and mar resistance. The free radical polymerization can occur by exposure to radiant energy (e.g., UV light, visible light and/or LED light) or to electron beam energy or to chemicals (e.g., free radical initiators that decompose and initiate free radical reactions when heated or in the presence of an accelerator, such as peroxides) for a time effective to cause cross-linking/polymerization of the free radical-curable ethylenically unsaturated compound component. The intensity and/or wavelength of the radiant energy may be adjusted as desired to achieve the desired extent of curing. The time period of exposure is not particularly limited, so long as the time period is effective to cure the coating composition into a viable article. Time frames for exposure to energy to cause sufficient cross-linking are not particularly limited and may be from several seconds to several minutes. The two part urethane reaction may begin, in certain embodiments of the invention, once the polyol and polyisocyanate are mixed (i.e., the polyol and isocyanate may be selected to be reactive with each other at the temperature at which mixing is performed; one or more catalysts may also be present to accelerate the urethane reaction). After coating, the urethane reaction may be accelerated by exposure to thermal energy by means of baking in an oven. Time frame is dependent on kinetics of the urethane reaction but typically conducting curing of the polyol and polyisocyanate at elevated temperature (50 to 150° C.) takes minutes to hours.

In various embodiments, a method of making and using the dual curable coating compositions described herein may comprise 1) incorporating one or more free radical-curable ethylenically unsaturated compounds into a polyisocyanate-containing component (or a polyol-containing component) using, for example, an overhead mixer with a propeller blade to obtain a first mixture; 2) adding photoinitiator and/or dispersant to the first mixture to obtain a second mixture; 3) adding matting agent to the second mixture with agitation until dispersed to obtain a third mixture; 4) adding a polyol-containing component (or a polyisocyanate-containing component, if a polyol-containing component was incorporated in step 1) to the third mixture with constant agitation to obtain the coating composition; 5) drawing down the coating composition on a surface of a substrate; 6) removing any solvent or water in the coating composition; 7) curing the coating composition by A) heating the coating composition, e.g., for 60 minutes at about 70° C. and then B) exposing the coating composition to radiation, e.g., irradiating with at least one mercury arc lamp at 400 W/in and a belt speed of 50 fpm or by performing steps A and B in the reverse order and, optionally, 7) allowing the coated substrate to sit overnight.

In various embodiments, the coating compositions described herein are liquid at ambient temperature (25° C.) with a viscosity of less than 4000 cPs or less than 3500 cPs or less than 3000 cPs or less than 2500 cPs. The compositions may have viscosities at 25° C. ranging from about 500 cPs to about 4000 cPs or from about 1000 cPs to about 3000 cPs or from about 1500 cPs to about 2500 cPs, as measured using a Brookfield viscometer, model DV-II, using a 27 spindle (with the spindle speed varying typically between 50 and 200 rpm, depending on viscosity). Such viscosities of the coating compositions described herein facilitate easy spreading of the compositions on a substrate for application as coatings and films. An effective amount of water, non-reactive solvent and/or reactive diluent may be included in the coating composition in order to reduce viscosity to a desired value.

The coating compositions may be applied to a substrate surface in any known conventional manner, for example, by spraying, knife coating, roller coating, casting, drum coating, dipping, and the like and combinations thereof. Indirect application using a transfer process may also be used. A substrate may be any commercially relevant substrate, such as a high surface energy substrate or a low surface energy substrate, such as a metal substrate or plastic substrate, respectively. The substrates may comprise metal, paper, cardboard, glass, thermoplastics such as polyolefins, polycarbonate, acrylonitrile butadiene styrene (ABS) and blends thereof, composites, wood, leather and combinations thereof.

The incorporation of free radical-curable ethylenically unsaturated compounds into a two-part urethane system can lead to coatings with enhanced durability properties while maintaining desirable soft feel properties. The enhanced durability (as compared to analogous compositions not containing free radical-curable ethylenically unsaturated compounds) may be apparent in improved properties such as increased stain resistance, increased abrasion resistance, increased scratch resistance and/or increased solvent resistance.

Free Radical-Curable Ethylenically Unsaturated Compounds

Ethylenically unsaturated compounds suitable for use in the present invention include compounds containing at least one carbon-carbon double bond, in particular a carbon-carbon double bond capable of participating in a free radical reaction. Such reactions may result in a polymerization or curing whereby the ethylenically unsaturated compound becomes part of a polymerized matrix or polymeric chain. In various embodiments of the invention, the ethylenically unsaturated compound may contain one, two, three, four, five or more carbon-carbon double bonds per molecule. Combinations of multiple ethylenically unsaturated compounds containing different numbers of carbon-carbon double bonds may be utilized in the coating compositions of the present invention. The carbon-carbon double bond may be present as part of an α,β-unsaturated carbonyl moiety, e.g., an α,β-unsaturated ester moiety such as an acrylate functional group or a methacrylate functional group. A carbon-carbon double bond may also be present in the ethylenically unsaturated compound in the form of a vinyl group $CH=CH_2$ (such as an allyl group, $-CH_2-CH=CH_2$). Two or more different types of functional groups containing carbon-carbon double bonds may be present in the ethylenically unsaturated compound. For example, the ethylenically unsaturated compound may contain two or more functional groups selected from the group consisting of vinyl groups (including allyl groups), acrylate groups, methacrylate groups and combinations thereof.

The coating compositions of the present invention may, in various embodiments, contain one or more (meth)acrylate functional compounds capable of undergoing free radical polymerization (curing). As used herein, the term "(meth)acrylate" refers to methacrylate ($-O-C(=O)-C(CH_3)=CH_2$) as well as acrylate ($-O-C(=O)-CH=CH_2$) functional groups. Suitable free radical-curable (meth)acrylates include compounds containing one, two, three, four or more (meth)acrylate functional groups per molecule; the free radical-curable (meth)acrylates may be oligomers or monomers.

The total amount of free radical-curable ethylenically unsaturated compound in the coating composition relative to the total amount of polyol and polyisocyanate present is not believed to be particularly critical, but generally is selected to be an amount effective to improve at least one characteristic of the cured coating obtained by curing the coating composition as compared to a cured coating containing the same components but not any free radical-curable ethylenically unsaturated compound. The improved characteristic(s) may include any one or more of the following:

a) Improved stain resistance;
b) Improved abrasion resistance;
c) Improved scratch resistance;
d) Improved chemical resistance.

In various embodiments of the invention, the weight ratio of (polyol+polyisocyanate):free radical curable ethylenically unsaturated compound (e.g., (meth)acrylate) is, for example, from 1:1 to 10:1 or 1.5:1 to 6:1 or 2:1 to 5:1. In other embodiments, the coating composition contains 5 to 50 weight % or 10 to 40 weight % or 10 to 35 weight % in total of free radical-curable ethylenically unsaturated compound (e.g., (meth)acrylate), such amounts being based on the total weight of the coating composition except for any non-reactive solvent or water that may be present.

Free Radical-Curable (Meth)Acrylate Oligomers

Suitable free radical-curable (meth)acrylate oligomers include, for example, polyester (meth)acrylates, epoxy (meth)acrylates, polyether (meth)acrylates, polyurethane (meth)acrylates and combinations thereof.

Exemplary polyester (meth)acrylates include the reaction products of acrylic or methacrylic acid or mixtures thereof with hydroxyl group-terminated polyester polyols. The reaction process may be conducted such that a significant concentration of residual hydroxyl groups remain in the polyester (meth)acrylate or may be conducted such that all or essentially all of the hydroxyl groups of the polyester polyol have been (meth)acrylated. The polyester polyols can be made by polycondensation reactions of polyhydroxyl functional components (in particular, diols) and polycarboxylic acid functional compounds (in particular, dicarboxylic acids and anhydrides). The polyhydroxyl functional and polycarboxylic acid functional components can each have linear, branched, cycloaliphatic or aromatic structures and can be used individually or as mixtures.

Examples of suitable epoxy (meth)acrylates include the reaction products of acrylic or methacrylic acid or mixtures thereof with glycidyl ethers or esters.

Suitable polyether (meth)acrylates include, but are not limited to, the condensation reaction products of acrylic or methacrylic acid or mixtures thereof with polyetherols which are polyether polyols. Suitable polyetherols can be linear or branched substances containing ether bonds and terminal hydroxyl groups. Polyetherols can be prepared by ring opening polymerization of cyclic ethers such as tetrahydrofuran or alkylene oxides with a starter molecule. Suitable starter molecules include water, hydroxyl functional materials, polyester polyols and amines.

Polyurethane (meth)acrylates (sometimes also referred to as "urethane (meth)acrylates") capable of being used in the coating compositions of the present invention include urethanes based on aliphatic and/or aromatic polyester polyols and polyether polyols and aliphatic and/or aromatic polyester diisocyanates and polyether diisocyanates capped with (meth)acrylate end-groups.

In various embodiments, the polyurethane (meth)acrylates may be prepared by reacting aliphatic and/or aromatic diisocyanates with OH group terminated polyester polyols (including aromatic, aliphatic and mixed aliphatic/aromatic polyester polyols), polyether polyols, polycarbonate polyols, polycaprolactone polyols, polydimethysiloxane polyols or polybutadiene polyols or combinations thereof to form isocyanate-functionalized oligomers which are then reacted with hydroxyl-functionalized (meth)acrylates such as hydroxyethyl acrylate or hydroxyethyl methacrylate to provide terminal (meth)acrylate groups. For example, the polyurethane (meth)acrylates may contain two, three, four or more (meth)acrylate functional groups per molecule.

One or more urethane diacrylates are employed in certain embodiments of the invention. For example, the coating composition may comprise at least one urethane diacrylate comprising a difunctional aromatic urethane acrylate oligomer, a difunctional aliphatic urethane acrylate oligomer and combinations thereof. In certain embodiments, a difunctional aromatic urethane acrylate oligomer, such as that available from Sartomer USA, LLC (Exton, Pa.) under the trade name CN9782, may be used as the at least one urethane diacrylate. In other embodiments, a difunctional aliphatic urethane acrylate oligomer, such as that available from Sartomer USA, LLC under the trade name CN9023, may be used as the at least one urethane diacrylate. CN9782, CN9023, CN978, CN965, CN9031, CN8881 and CN8886, all available from Sartomer USA, LLC, may all be advantageously employed as urethane diacrylates in the coating compositions of the present invention.

In various embodiments of the invention, the at least one urethane diacrylate may be present in the coating composition in a total amount of from about 1% to about 30% by weight or from about 5% to about 25% by weight or from about 10% to about 20% by weight (such amounts being based on the total weight of all components of the coating composition, other than any non-reactive solvent or water that may be present).

Free Radical-Curable (Meth)Acrylate Monomers

Illustrative examples of suitable free radical-curable monomers include 1,3-butylene glycol di(meth)acrylate, butanediol di(meth)acrylate, 1,6-hexanediol di(meth)acrylate, alkoxylated hexanediol di(meth)acrylate, alkoxylated aliphatic di(meth)acrylate, alkoxylated neopentyl glycol di(meth)acrylate, dodecyl di(meth) acrylate cyclohexane dimethanol di(meth)acrylate, diethylene glycol di(meth) acrylate, dipropylene glycol di(meth)acrylate, n-alkane di(meth) acrylate, polyether di(meth) acrylates, ethoxylated bisphenol A di(meth)acrylate, ethylene glycol di(meth)acrylate, neopentyl glycol di(meth)acrylate, polyester di(meth) acrylate, polyethylene glycol di(meth)acrylate, polypropylene glycol di(meth)acrylate, propoxylated neopentyl glycol diacrylate, tricyclodecane dimethanol diacrylate, triethylene glycol di(meth)acrylate, tetraethylene glycol di(meth)acrylate tripropylene glycol di(meth)acrylate, ditrimethylolpropane tetra(meth)acrylate, dipentaerythritol penta(meth)acrylate, ethoxylated pentaerythritol tetra(meth)acrylate, dipentaerythritol penta(meth)acrylate, dipentaerythritol penta(meth)acrylate, penta(meth)acrylate ester, pentaerythritol tetra(meth)acrylate, ethoxylated trimethylolpropane tri (meth)acrylate, alkoxylated trimethylolpropane tri(meth) acrylate, highly propoxylated glyceryl tri(meth)acrylate, trimethylolpropane tri(meth)acrylate, trimethylolpropane tri (meth)acrylate, pentaerythritol tri(meth)acrylate, propoxylated glyceryl tri(meth)acrylate, propoxylated trimethylolpropane tri(meth)acrylate, trimethylolpropane trimethacrylate, tris (2-hydroxy ethyl) isocyanurate tri (meth)acrylate, 2(2-ethoxyethoxy) ethyl (meth)acrylate, 2-phenoxyethyl (meth)acrylate, 3,3,5-trimethylcyclohexyl (meth)acrylate, alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formal (meth)acrylate, cycloaliphatic acrylate monomer, dicyclopentadienyl (meth)acrylate, diethylene glycol methyl ether (meth)acrylate, ethoxylated (4) nonyl phenol (meth)acrylate, ethoxylated nonyl phenol (meth) acrylate, isobornyl (meth)acrylate, isodecyl (meth)acrylate, isooctyl (meth)acrylate, lauryl (meth)acrylate, methoxy polyethylene glycol (meth)acrylate, octyldecyl (meth)acrylate, stearyl (meth)acrylate, tetrahydrofurfuryl (meth) acrylate, tridecyl (meth)acrylate and/or triethylene glycol ethyl ether (meth)acrylate, t-butyl cyclohexyl (meth)acrylate, alkyl (meth)acrylate, dicyclopentadiene di(meth)acrylate, alkoxylated nonylphenol (meth)acrylate, phenoxyethanol (meth)acrylate, octyl (meth)acrylate, decyl (meth)acrylate, dodecyl (meth)acrylate, tetradecyl (meth)acrylate, tridecyl (meth)acrylate, cetyl (meth)acrylate, hexadecyl (meth)acrylate, behenyl (meth)acrylate, diethylene glycol ethyl ether (meth)acrylate, diethylene glycol butyl ether (meth)acrylate, triethylene glycol methyl ether (meth)acrylate, dodecanediol di (meth)acrylate, dodecane di (meth)acrylate, dipentaerythritol penta/hexa(meth)acrylate, pentaerythritol tetra(meth) acrylate, ethoxylated pentaerythritol tetra(meth)acrylate, ethoxylated trimethylolpropane tri(meth)acrylate, trimethylolpropane tri(meth)acrylate, di-trimethylolpropane tetra(meth)acrylate, propoxylated glyceryl tri(meth)acrylate, pentaerythritol tri(meth)acrylate, propoxylated glyceryl tri (meth)acrylate, propoxylated trimethylolpropane tri(meth) acrylate, trimethylolpropane tri(meth)acrylate and tris (2-hydroxy ethyl) isocyanurate tri(meth)acrylate and combinations thereof.

In various embodiments of the present invention, the coating composition advantageously contains one or more isocyanurate tri(meth)acrylates or a (meth)acrylated derivative of an isocyanurate (such as a urethane (meth)acrylate derived from an isocyanurate). For example, the coating composition may comprise tris(2-hydroxyethyl)isocyanurate triacrylate. In certain embodiments of the invention, the at least one isocyanurate tri(meth)acrylate is present in the composition in an amount of from about 1% to about 50% by weight (or from about 2% to about 20% by weight), based on the total weight of the components of the coating composition except for any water or non-reactive solvent that may be present.

Isocyanurate tri(meth)acrylates suitable for use in the present invention may be prepared by any method known in the art or may be obtained from commercial sources, such as, for example, the isocyanurate tri(meth)acrylate product sold by Sartomer USA, LLC under the trade name SR368 (tris(2-hydroxyethyl)isocyanurate triacrylate). The urethane (meth)acrylate sold by Sartomer USA, LLC under the trade name CN9008 is an example of a urethane (meth)acrylate derived from an isocyanurate.

In certain embodiments, the coating composition does not contain any free radical-curable component other than isocyanurate tri(meth)acrylate (and, optionally, urethane diacrylate) or contains less than 5% or less than 1% by weight in total of free radical-curable components other than isocyanurate tri(meth)acrylate (and, optionally, urethane diacrylate).

Dual Functional Ethylenically Unsaturated Compounds

Also suitable for use in the compositions of the present invention are monomers and oligomers as described above containing: A. both one or more isocyanate functional groups per molecule and one or more (meth)acrylate functional groups per molecule or B. both one or more hydroxyl functional groups per molecule and one or more (meth)acrylate functional groups per molecule.

Illustrative examples of such dual functional monomers and oligomers include, but are not limited to, A. monoisocyanate-(meth)acrylate monomers, such as 2-isocyanatoethyl acrylate and 2-isocyanatoethyl methacrylate, as well as B. epoxy (meth)acrylates (wherein the epoxy groups of an epoxy compound, such as a diepoxide, have been ring-opened by reaction with an unsaturated carboxylic acid such as (meth)acrylic acid). Commercially available hydroxyl-functionalized (meth)acrylates suitable for use in the present invention include, but are not limited to, the products sold by Sartomer USA, LLC under the trade names SR495, CN152, CN132, CN133, CN120, CN104 and CN110.

In certain embodiments of the invention, one or more isocyanate-functionalized urethane (meth)acrylates are used in the coating composition, either as the sole free radical-curable (meth)acrylate or in combination with one or more other types of free radical-curable (meth)acrylates. Isocyanate-functionalized urethane (meth)acrylates may be prepared, for example, by reacting a polyisocyanate with a (meth)acrylate containing an isocyanate-reactive functional group such as a hydroxyl group, in a ratio such that at least one isocyanate group remains in the molecule produced by such reaction (e.g., by having an excess of isocyanate groups relative to isocyanate-reactive groups). The product sold by Sartomer USA, LLC under the trade name of CN9302 is an example of an isocyanate-functionalized urethane (meth) acrylate suitable for use in the present invention.

Polyols

The coating compositions of the present invention contain at least one polyol, which may be defined as an organic compound containing two or more hydroxyl functional groups per molecule capable of reacting with the isocyanate groups of the polyisocyanate component to form polyurethane. In certain embodiments, the polyol is oligomeric. In certain other embodiments, the polyol is difunctional (i.e., the polyol contains two hydroxyl groups per molecule, in particular a hydroxyl group at each end of a linear or branched oligomeric backbone). Suitable polyols may include polyester polyols, polyether polyols, polyester/ether polyols, polycarbonate polyols, polycarbonate polyester polyols, polyacrylic polyols, polyurethane polyols, polycaprolactone polyols, polyolefin polyols and combinations thereof. In one particularly useful embodiment, the polyol component of the coating composition comprises a linear aliphatic polyester polyol, which may be used alone or in blends with other polyols. The polyol may, in certain embodiments of the invention, have a hydroxyl equivalent weight ranging from 100 to 1500 grams per equivalent, such as 150 to 500 grams per equivalent. The polyol may, in various embodiments of the invention, have a glass transition temperature of less than 60° C., such as less than 40'C or less than 22° C. or less than 0° C. In certain embodiments, the compositions of the invention have a total polyol content of 40 to 75% by weight, such as 50 to 75% by weight of polyol, based on the total weight of the coating composition except for any non-reactive solvent or water that may be present.

In certain embodiments, the polyol may be a polyacrylic polyol or a combination of polyacrylic polyols. Such polyols (which generally do not contain any sites of ethylenic unsaturation) can, for example, be prepared by the polymerization of polymerizable ethylenically unsaturated monomers, at least one of which is a hydroxy-functionalized ethylenically unsaturated monomer such as one or more hydroxyalkyl esters of (meth)acrylic acid. Ethylenically unsaturated monomers which can be suitably copolymerized with hydroxy-functionalized ethylenically unsaturated monomer(s) include, for example, (meth)acrylic acid, alkyl esters of (meth)acrylic acid including methyl (meth)acrylate, ethyl (meth) acrylate, butyl (meth) acrylate and 2-ethyl hexylacrylate and vinyl aromatic compounds, such as styrene, alpha-methyl styrene and vinyl toluene.

In other embodiments, the polyol may be a polyester polyol. Examples of polyester polyols include, for example, the condensation products of polyhydric alcohols and polycarboxylic acids. Suitable polyhydric alcohols include ethylene glycol, neopentyl glycol, trimethylolpropane and pentaerythritol. Suitable polycarboxylic acids include aliphatic and aromatic polycarboxylic acids such as adipic acid, 1,4-cyclohexyl dicarboxylic acid and hexahydrophthalic acid. In addition to the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions can be selected to result in a polyester polyol with the desired hydroxyl functionality and hydroxyl equivalent weight.

In other embodiments, the polyol may be a polyurethane polyol. For example, polyurethane polyols may be formed by reacting a polyol (including any of the types described herein, such as polyether polyols and polyester polyols) with a polyisocyanate with the stoichiometry being controlled so as to form a polyurethane polymer having hydroxyl functionality. Examples of suitable polyisocyanates are aromatic isocyanates, such as 4,4'-diphenylmethane diisocyanate, 1,3-phenylene diisocyanate and toluene diisocyanate and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate, also can be employed.

In other embodiments, the polyol may be a polyether polyol or combination of polyether polyols. Examples of suitable polyether polyols include polyalkylene ether polyols. Exemplary polyalkylene ether polyols include poly(oxytetramethylene) glycols, poly(oxyethylene) glycols, poly(oxy-1,2-propylene) glycols, poly(oxyethylene/oxypropylene) glycols and poly(oxy-1,2-butylene) glycols.

Also useful are polyether polyols formed from oxyalkylation of various polyols, for example, glycols such as ethylene glycol, 1,6-hexanediol, bisphenol A and the like or other higher polyols such as glycerol, trimethylolpropane, pentaerythritol and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene and/or ethylene oxide, in the presence of an acidic, basic or other suitable catalyst.

Polyisocyanates

Any organic compound containing two or more isocyanate functional groups per molecule may be utilized as the polyisocyanate component of the coating compositions of the present invention. Such polyisocyanates may be used individually or in combination. Diisocyanates, triisocyanates or combinations thereof in particular are suitable for use.

The polyisocyanates may, for example, be of an aromatic, aliphatic and/or cycloaliphatic nature and have a molecular weight of 126-1000. These may also comprise diisocyanates containing ether or ester groups. Examples of suitable diisocyanates are trimethylene diisocyanate, tetramethylene diisocyanate, pentamethylene diisocyanate, hexamethylene diisocyanate, isophorone diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate, 2,6-tolylene diisocyanate, 4,4-diisocyanatodiphenylether, 1,5-dibutylpentamethylene diisocyanate, 2,3-bis(8-isocyanatooctyl)-4-octyl-5-hexylcyclohexane, 3-isocyanatomethyl-1-methylcyclohexyl isocyanate and/or 2,6-diisocyanatomethyl caproate and isomers and combinations thereof. The polyisocyanates can be blocked or unblocked. Examples of other suitable polyisocyanates include isocyanurate trimers, allophanates and uretdiones of diisocyanates and polycarbodiimides. In particular embodiments, the polyisocyanate is an isocyanurate of hexamethylene diisocyanate (i.e., hexamethylene diisocyanate isocyanurate).

Generally speaking, polyisocyanate will be used in an amount sufficient to crosslink with at least a portion of the hydroxyl groups on the polyol(s) or other hydroxyl functional components, when present, in the coating composition. The relative amounts of the polyol(s) and other hydroxyl functional components compared to polyisocyanate (and other isocyanate functional components) may be expressed by the mole ratio of the reactive isocyanate groups (including any masked or blocked isocyanate groups) to reactive hydroxyl groups. Polyisocyanate may, for example, be present in a ratio of about 0.5:1 to about 4:1 based on the NCO:OH ratio.

The coating compositions of the present invention may include an amount of one or more catalysts that catalyze the isocyanate/hydroxyl reaction. Useful catalysts may include tertiary amines, such as triethylene diamine, N-methyl morpholine, N-ethyl morpholine, diethyl ethanolamine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propylamine, N,N-dimethyl benzyl amine, dicyclohexylmethylamine, 2,4,6-tris dimethylaminomethylphenol, N,N-dimethyl cyclohexylamine, triethylamine, tri-n-butylamine, 1,8-diaza-bichloro[5,40]-undecene-7 N-methyl diethanolamine, N,N-dimethyl ethanolamine, N,N-diethyl cyclohexylamine, N,N,N'N'-tetramethyl-ethylene diamine, 1,4-diaza-bicyclo-[2,2,2]-octane N-methyl-N-dimethylaminoethyl-piperazine, bis-(N,N-diethylaminoethyl)-adipate, N,N-diethylbenzylamine, pentamethyldiethylene triamine, N,N,N',N'-tetramethyl-1,3-butanediamine, 1,2-dimethylimidazole, 2-methylimidazole; tin compounds, such as stannous chloride, dibutyl tin di-2-ethyl hexoate, stannous octoate, dibutyl tin dilaurate, trimethyl tin hydroxide, dimethyl tin dichloride, dibutyl tin diacetate, dibutyl tin oxide, tributyl tin acetate, tetramethyl tin, dimethyl dioctyl tin, tin ethyl hexoate, tin laurate, dibutyl tin maleate, dioctyl tin diacetate; other metalloorganics, such as zinc octoate, phenyl mercuric propionate, lead octoate, lead naphthenate and copper naphthenate.

Solvents

In certain embodiments of the invention, the coating composition may contain one or more solvents, in particular one or more organic solvents, which may be non-reactive organic solvents. In various embodiments, the solvent(s) may be relatively volatile, e.g., solvents having a boiling point at atmospheric pressure of not more than 150° C. In other embodiments, the solvent(s) may have a boiling point at atmospheric pressure of at least 40° C.

The solvent(s) may be selected so as to be capable of solubilizing one or more components of the coating composition and/or adjusting the viscosity or other rheological properties of the coating composition.

The coating compositions of the present invention may be formulated so as to contain little or no non-reactive solvent, e.g., less than 10% or less than 5% or even 0% non-reactive solvent, based on the total weight of the coating composition. Such solvent-less or low-solvent compositions may be formulated using various components, including for example low viscosity reactive diluents and/or water, which are selected so as to render the composition sufficiently low in viscosity, even without solvent being present, that the composition can be easily applied at a suitable application temperature to a substrate surface so as to form a relatively thin, uniform coating layer.

Suitable solvents may include, for example, organic solvents such as: ketones (both acyclic ketones and cyclic ketones) such as acetone, methyl ethyl ketone, iso-butyl ethyl ketone and cyclopentanone; esters such as ethyl acetate, butyl acetate, ethylene glycol methyl ether acetate, ethylene glycol monoethyl ether acetate, ethylene glycol monobutyl ether acetate and propylene glycol methyl ether acetate; carbonates such as dimethyl carbonate, propylene glycol carbonate and ethylene glycol carbonate; alcohols such as ethoxyethanol, methoxyethanol, 1-methoxy-2-propanol, methyl alcohol, ethyl alcohol, n-propyl alcohol, butyl alcohol, isopropyl alcohol and diacetone alcohol; aromatic solvents such as xylene, benzene, toluene and ethylbenzene; alkanes such as hexanes and heptane; glycol ethers such as ethylene glycol monobutyl ether (butyl cellosolve), ethylene glycol monomethyl ether (2-methoxyethanol), ethylene glycol monoethyl ether (2-ethoxyethanol), ethylene glycol monopropyl ether (2-propoxyethanol), ethylene glycol monoisopropyl ether (2-isopropoxyethanol), ethylene glycol monophenyl ether (2-phenoxyethanol), ethylene glycol monobenzyl ether (2-benzyloxyethanol), diethylene glycol monomethyl ether (methyl carbitol), diethylene glycol monoethyl ether (carbitol cellosolve), diethylene glycol mono-n-butyl ether (2-(2-butoxyethoxy)ethanol), ethylene glycol dimethyl ether, ethylene glycol diethyl ether and ethylene glycol dibutyl ether; ethers such as tetrahydrofuran, dimethyl ether, diethyl ether; as well as amides such as NMP and DMF; as well as combinations thereof.

In various embodiments, the coating composition is comprised of at least one solvent selected from the group consisting of ketones, esters, carbonates, alcohols, alkanes, aromatics, ethers, amides and glycol ethers and combinations thereof.

According to certain aspects of the invention, the at least one solvent is included in an amount sufficient to render the coating compositions described herein sufficiently flowable for application to a substrate. For example, in various embodiments of the invention, the coating compositions described herein have a viscosity of less than 4000 mPa·s (cPs) or less than 3500 mPa·s (cPs) or less than 3000 mPa·s (cPs) or less than 2500 mPa·s (cPs), as measured at 25° C. using a Brookfield viscometer, model DV-II, using a 27 spindle (with the spindle speed varying typically between 50 and 200 rpm, depending on viscosity).

In particular embodiments, the at least one solvent is removed from the coating compositions described herein before curing by exposure to an energy source (radiation, heating) is initiated. For example, solvent may be removed by evaporation prior to energy-induced curing. If so desired, a substrate having one or more layers of the coating composition applied to a surface thereof may be heated and/or subjected to a flow of gas and/or placed under vacuum so as to facilitate solvent evaporation. Heating of the coated substrate will also help to promote curing (reaction) of the polyol and polyisocyanate components of the coating composition.

Water-Borne Systems

In certain embodiments of the invention, the coating composition is formulated to contain water, rather than non-reactive solvent. Such compositions may be referred to as water-borne systems, wherein one or more or all of the components of the composition are present as dispersions in water. Emulsifiers and/or dispersing agents may be employed to create and maintain stable aqueous dispersions of the polyol, polyisocyanate, free radical-curable ethylenically unsaturated compound and/or other composition components. One or more of the composition components may, in certain embodiments, be self-dispersing. Blocked and/or masked polyisocyanates may be employed in such systems so as to avoid or minimize reaction of the water with the isocyanate. Such a water-borne composition may be applied to the surface of a substrate, with the water serving to reduce the viscosity of the composition. The applied coating may then be treated to remove the water (by evaporation, for example), wherein the coating is thereafter maintained at a temperature effective to cause the masked or blocked polyisocyanate to react with the polyol component of the composition, leading to curing of the coating. Curing of the (meth)acrylate component of the composition (for example, by irradiation of the coating by an appropriate energy source) may be conducted after evaporation of the water and before or after heat curing of the polyol and polyisocyanate.

Photoinitiators

In certain embodiments of the invention, the compositions described herein include at least one photoinitiator and are curable with radiant energy. For example, the photoinitiator(s) may be selected from the group consisting of α-hydroxyketones, phenylglyoxylates, benzyldimethylketals, α-aminoketones, mono-acyl phosphines, bis-acyl phosphines, phosphine oxides, metallocenes and combinations thereof. In particular embodiments, the at least one photoinitiator may be 1-hydroxy-cyclohexyl-phenyl-ketone and/or 2-hydroxy-2-methyl-1-phenyl-1-propanone.

Suitable photoinitiators include, but are not limited to, 2-methylanthraquinone, 2-ethylanthraquinone, 2-chloroanthraquinone, 2 benzyanthraquinone, 2-t-butylanthraquinone, 1,2-benzo-9,10-anthraquinone, benzyl, benzoin, benzoin methyl ether, benzoin ethyl ether, benzoin isopropyl ether, alpha-methylbenzoin, alpha-phenylbenzoin, Michler's ketone, benzophenone, 4,4'-bis-(diethylamino) benzophenone, acetophenone, 2,2 diethyloxyacetophenone, diethyloxyacetophenone, 2-lsopropylthioxanthone, thioxanthone, diethyl thioxanthone, 1,5-acetonaphtlene, ethyl-p-dimethylaminobenzoate, benzil ketone, α-hydroxy keto, 2,4,6-trimethylbenzoyldiphenyl phosphinoxide, benzyl dimethyl ketal, benzil ketal (2,2-dimethoxy-1,2-diphenylethanone), 1-hydroxycylclohexyl phenyl ketone, 2-methyl-1-[4-(methylthio) phenyl]-2-morpholinopropanone-1, 2-hydroxy-2-methyl-1-phenyl-propanone, oligomeric α-hydroxy ketone, phenylbis(2,4,6-trimethylbenzoyl)phosphine oxide, ethyl-4-dimethylamino benzoate, ethyl(2,4,6-trimethylbenzoyl)phenyl phosphinate, anisoin, anthraquinone, anthraquinone-2-sulfonic acid, sodium salt monohydrate, (benzene)tricarbonylchromium, benzil, benzoin isobutyl ether, benzophenone/1-hydroxycyclohexyl phenyl ketone, 50/50 blend, 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl)phosphine oxide/2-hydroxy-2-methylpropiophenone, 50/50 blend, 4'-ethoxyacetophenone, 2,4,6-trimethylbenzoyldiphenylphophine oxide, phenyl bis(2,4,6-trimethyl benzoyl)phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, (cumene)cyclopentadienyl iron (ii) hexafluorophosphate, 9,10-diethoxy and 9,10-dibutoxyanthracene, 2-ethyl-9,10-dimethoxyanthracene, thioxanthen-9-one and combinations thereof.

The amount of photoinitiator is not considered to be critical, but may be varied as may be appropriate depending upon the photoinitiator(s) selected, the amount of free radical-curable ethylenically unsaturated compound present in the coating composition, the radiation source and the radiation conditions used, among other factors. Typically, however, the amount of photoinitiator may be from 0.05% to 5% by weight, based on the total weight of the coating composition (not including any water or non-reactive solvent that may be present).

Other Curing Methods

In certain embodiments of the invention, the coating compositions described herein do not include any initiator and are curable with electron beam energy. In other embodiments, the coating compositions described herein include at least one free radical initiator that decomposes when heated or in the presence of an accelerator and are curable chemically (i.e., without having to expose the coating composition to radiation). The at least one free radical initiator that decomposes when heated or in the presence of an accelerator may, for example, comprise a peroxide or azo compound. Suitable peroxides for this purpose may include any compound, in particular any organic compound, that contains at least one peroxy (—O—O—) moiety, such as, for example, dialkyl, diaryl and aryl/alkyl peroxides, hydroperoxides, percarbonates, peresters, peracids, acyl peroxides and the like. The at least one accelerator may comprise, for example, at least one tertiary amine and/or one or more other reducing agents based on metal salts (such as, for example, carboxylate salts of transition metals such as iron, cobalt, manganese, vanadium and the like and combinations thereof). The accelerator(s) may be selected so as to promote the decomposition of the free radical initiator at room or ambient temperature to generate active free radical species, such that curing of the coating composition is achieved without having to heat or bake the coating composition. In other embodiments, no accelerator is present and the coating composition is heated to a temperature effective to cause decomposition of the free radical initiator and to generate free radical species which initiate curing of the free radical-curable ethylenically unsaturated compound(s) present in the coating composition.

Thus, in various embodiments of the present invention, the coating compositions described herein are curable by techniques selected from the group consisting of radiation curing (UV radiation or electron beam curing), electron beam curing, chemical curing (using a free radical initiator that decomposes when heated or in the presence of an accelerator, e.g., peroxide curing), heat curing or combinations thereof.

Polymer Beads/Waxes

In certain embodiments of the invention, the coating composition contains one or more types of polymer waxes and/or polymer beads. For example, the beads may be micron size beads that aid in imparting soft feel to a cured coating of the coating composition. Such polymer beads may be comprised of, for example, a polymer selected from the group consisting of poly(meth)acrylates, polyurethanes, polyamides, polyolefins (e.g., polyethylenes), PTFEs and combinations thereof.

Matting Agents

The coating compositions of the present invention may optionally contain one or matting agents, that is, components capable of imparting a matte finish to the coating composition when cured on the surface of a substrate or reducing the gloss of the coating composition when cured on a substrate surface. Matting agents are sometimes also referred to as "flatting agents" or "flattening agents". Matting agents are generally small solid particles of material that are insoluble in water and are effective to reduce gloss. Preferably, the matting agent particles have a size of from about 0.05 to about 50 microns. In certain embodiments, the matting agent particles are agglomerated in the form of clumps or agglomerates. The matting agent particles may be inorganic or organic. Examples of suitable inorganic flattening agents include silicates, such as talc and various forms of silica, such as amorphous, aerogel, diatomaceous, hydrogel and fumed silicas. Examples of suitable organic flattening agents include insoluble urea-formaldehyde resins, polyethylene, polypropylene, cellulosic fibers and polyurethane/polyurea copolymers. Polymer waxes and beads can be employed as matting agents. The amount of matting agent added to the coating composition depends on the desired final gloss level. In certain embodiments, an amount of matting agent can be added to provide the coating composition, when cured, with a gloss of less than 5 measured at a 60 degree angle.

Other Additives

The coating compositions of the present invention may optionally contain one or more additives instead of or in addition to the above-mentioned ingredients. Such additives include, but are not limited to, antioxidants, ultraviolet absorbers, photostabilizers, foam inhibitors, flow or leveling agents, colorants, pigments, dispersants (wetting agents), slip additives or other various additives, including any of the additives conventionally utilized in the coating art.

Exemplary Formulations

In certain embodiments of the invention, the coating composition may comprise, consist essentially of or consist of the following components, wherein the amounts stated are in percent by weight based on the total "solids" content (i.e., not including any water and/or non-reactive solvent that may be present):

| Component | Wt. % |
| --- | --- |
| Polyol(s) | 25-80% |
| Polyisocyanate(s) | 5-40% |
| Ethylenically unsaturated compound(s) | 5-50% |
| Matting agent(s) | 0-10% |
| Photoinitiator(s) | 0-5% |

In addition, up to 70% by weight water and/or non-reactive solvent(s) may be present in various embodiments of the invention, such amount being calculated based on the total weight of all "solids" in the coating composition.

In other embodiments of the invention, the coating composition is a non-reactive solvent-containing composition that may comprise, consist essentially of or consist of the following components, wherein the amounts stated are in percent by weight based on the total "solids" content (i.e., not including the non-reactive solvent that is present):

| Component | Wt. % |
| --- | --- |
| Polyol(s) | 45-75% |
| Polyisocyanate(s) | 5-20% |
| Ethylenically unsaturated compound(s) | 10-40% |
| Matting agent(s) | 2-8% |
| Photoinitiator(s) | 1-3% |

In addition, 30 to 50% by weight of one or more non-reactive solvents is present, such amount being calculated based on the total weight of all "solids" in the coating composition.

In certain embodiments of the above-mentioned exemplary formulations, the ethylenically unsaturated compound component of the formulation may comprise, consist essentially of or consist of at least one urethane diacrylate and at least one isocyanurate tri(meth)acrylate. In certain other embodiments of the above-mentioned exemplary formulations, the ethylenically unsaturated compound component of the formulation may comprise, consist essentially of or consist of at least one isocyanate functionality-containing urethane acrylate. In still other embodiments of the above-mentioned exemplary formulations, the ethylenically unsaturated compound component of the formulation may comprise, consist essentially of or consist of at least one isocyanate-reactive functionality-containing (meth)acrylate.

Substrates

A substrate to which a coating composition in accordance with the present invention may be applied and cured may be any commercially relevant substrate, such as a high surface energy substrate or a low surface energy substrate, such as a metal substrate or plastic substrate, respectively. The substrates may comprise steel or other metal, paper, cardboard, glass, a thermoplastic such as polyolefins, polycarbonate, acrylonitrile butadiene styrene or blends thereof, composites, wood, leather and combinations thereof.

Exemplary Methods of Applying and Curing the Coating Compositions

In various embodiments, a method of coating a substrate with the coating compositions described herein may comprise, consist of, or consist essentially of applying the composition to a substrate (wherein, for example, the applied composition is in the form of a layer on a surface of a substrate) and curing the composition, wherein the curing comprises curing by exposing the coating composition to visible radiation, to UV radiation, to LED radiation, to electron-beam radiation, by exposure to chemicals or by heating. In various embodiments of the invention, the coating compositions may be applied to a substrate by a method selected from the group consisting of spraying, knife coating, roller coating, casting, drum coating, dipping and combinations thereof. A plurality of layers of a coating composition in accordance with the present invention may be applied to a substrate surface; the plurality of layers may be simultaneously cured (by exposure to a single dose of radiation, for example) or each layer may be successively cured before application of an additional layer of coating composition.

The thickness of the coating prepared from the coating compositions of the present invention may be varied as may be desired for a particular end use application, but typically will be in the range of from 10 microns to 200 microns.

Exemplary End Use Applications

In various embodiments of the invention, the coating compositions described herein may be used to provide coatings and/or films, such as coatings and/or films for automobiles and other motor vehicles (e.g., as coatings on armrests, dashboards, seating, switches, controls and other interior components), aeronautic components, small appliances, packaging (e.g., cosmetics packaging), printing enhancements (inks), coatings on leathers and synthetic leathers and/or consumer electronics. For example, the coating compositions may be cured prior to use as coatings and/or films for such end use applications.

EXAMPLES

The Examples using the dual curable compositions described herein report properties related to feel, hardness, adhesion, abrasion resistance and stain resistance. The properties reported for the Examples were determined using a number of known techniques. Pencil hardness (mar resistance) was determined in accordance with ASTM D3363-05. Adhesion was determined in accordance with ASTM D3359-09. Abrasion resistance was determined in accordance with ASTM F2357-10. MEK (solvent) resistance was determined in accordance with ASTM D5402-06. Stain resistance was determined in accordance with ANSI/KCMA A161.1 chemical resistance test with ΔE measurements. Stain resistance was also determined in accordance with General Motors sunscreen and insect repellant resistance test procedures, e.g., GMW14445. With the exception of GMW14445 (performed at 80° C.), the aforementioned tests were performed at room temperature and ambient humidity.

For each of the Examples, the compositions were applied on substrates with a target thickness of 36 μm. The type of substrate used depended upon the particular test(s) being run. ABS panels were used for evaluation of adhesion and feel, glass was used to evaluate abrasion and pencil hardness, metal leneta was used to evaluate stain resistance, and aluminum was used to evaluate MEK resistance. The applied compositions were dual cured using a combination of the two part (polyol+polyisocyanate) urethane reaction and free radical cure. The coated panels were thermally cured, i.e., baked, to accelerate the urethane reaction, while the free radical cure was completed using UV-light. The thermal cure was achieved by heating the samples at 70° C. for 60 minutes. The UV cure was administered using one 600 W/in H-bulb lamp at 50 feet per minute for two passes. The coated ABS panels, after curing, exhibited a soft feel characterized as "velvety" or "rubbery", good adhesion on ABS (6×6 crosshatch) and good mar and solvent resistance. The coatings of the Examples were compared to commercially available two-part urethane soft feel coatings without free radical-curable (meth)acrylate and were rated by experienced observers with respect to type of feel (rubbery, velvety, silky) and softness (1=no soft feel, 5=best soft feel).

The compositions of Examples 1-3 are listed below in Table 1, whereby ingredients and respective masses added are provided. Additionally, the weight percentages on total formulation weight for Examples 1-3 are given in Table 2 which includes the solvent incorporated in the two part urethane. Initial testing included the formulations of Examples 1 and 2. Formulation 1 was subsequently altered to produce Example 3 at reduced added free radical-curable (meth)acrylate content. Formulation 2 had reduced two part urethane hardener content, allowing residual hydroxyl content of the two part urethane polyol resin to react with the isocyanate-containing urethane acrylate.

TABLE 1

Composition by weight for dual curable formulations

| Product | Example 1 | Example 2 | Example 3 |
|---|---|---|---|
| Two part urethane polyol resin (polyester diol) | 25 g | 25 g | 25 g |
| Two part urethane isocyanate hardener (hexamethylene diisocyanate polymer) | 6.30 g | 3.15 g | 6.3 g |
| Urethane diacrylate (CN9782, product of Sartomer USA, LLC) | 4.49 g | 0 g | 2.60 g |
| Triisocyanurate derivative (SR368, product of Sartomer USA, LLC) | 2.99 g | 0 g | 1.74 g |
| Isocyanate functionality containing urethane acrylate (CN9302, product of Sartomer USA, LLC) | 0 g | 5.31 g | 0 g |
| Matting agent (Acematt® 3300 treated silica) | 0.64 g | 0.45 g | 0.64 g |
| Photoinitiator (1-hydroxy-cyclohexylphenyl-ketone) | 0.374 g | 0.265 g | 0.217 g |

TABLE 2

Composition by weight percent for dual curable formulations

| Product | Example 1 | Example 2 | Example 3 |
|---|---|---|---|
| Two part urethane polyol resin solids (polyester diol) | 35.7% | 41.5% | 38.9% |
| Two part urethane isocyanate hardener solids (hexamethylene diisocyanate polymer) | 8.0% | 4.7% | 8.8% |
| Two part urethane incorporated solvent (mixture of solvents) | 34.9% | 36.2% | 38.1% |
| Urethane diacrylate (CN9782, product of Sartomer USA, LLC) | 11.3% | 0.0% | 7.1% |
| Triisocyanurate derivative (SR368, product of Sartomer USA, LLC) | 7.5% | 0.0% | 4.8% |
| Isocyanate functionality containing urethane acrylate (CN9302, product of Sartomer USA, LLC) | 0.0% | 15.5% | 0.0% |
| Matting agent (Acematt® 3300 treated silica) | 1.6% | 1.3% | 1.8% |

TABLE 2-continued

Composition by weight percent for dual curable formulations

| Product | Example 1 | Example 2 | Example 3 |
|---|---|---|---|
| Photoinitiator (1-hydroxy-cyclohexylphenyl-ketone) | 0.9% | 0.8% | 0.6% |

A comparative Example is also provided, which is a two-part system comprising multifunctional isocyanate and a difunctional polyol in solvent. The comparative Example employed 87.45 g of ST2010 clear resin (available from The Alsa Corporation) with 22.05 g of ST2010 hardener (also available from The Alsa Corporation). Substrates coated with the two part, curable composition of the comparative Example were prepared in a similar manner to the substrates coated with the dual curable composition of Examples 1-3.

Table 3 is provided below and includes test results for Examples 1-3 and the comparative Example with respect to certain properties, such as feel, gloss, pencil hardness and adhesion.

TABLE 3

Film properties of two-part curable formulations and Comparative Example

| Formulation | Feel Type | Feel Rank (5 = best) | Gloss | Pencil | Adhesion |
|---|---|---|---|---|---|
| Comparative Example | Velvety | 4 | 2.2 | 7B | 100 |
| Example 1 | Rubbery | 2 | 30.9 | 2B | 100 |
| Example 2 | Velvety | 3 | 1.6 | B | 100 |
| Example 3 | Velvety | 4 | 1.3 | 3B | 100 |

Table 4 is provided below and includes test results for Examples 1-3 and the comparative Example with respect to stain resistance to multiple products and chemical (MEK) resistance.

TABLE 4

Resistance properties of Examples 1-3 and the Comparative Example

| Formulation | Coffee Stain ΔE | Mustard Stain ΔE | Ketchup Stain ΔE | Red Wine Stain ΔE | MEK Resistance (Double Rubs) |
|---|---|---|---|---|---|
| Comparative Example | 13.80 | 15.86 | 8.85 | 12.80 | 24 |
| Example 1 | 10.74 | 14.62 | 12.18 | 8.62 | 79 |
| Example 2 | 10.74 | 14.62 | 12.18 | 8.62 | 79 |
| Example 3 | 5.1 | 2.64 | 6.35 | 23.55 | 47 |

Table 5 is provided below and includes test results for Example 3 and the comparative Example delineating the variation in properties due to the order in which the dual cure is carried out. Additionally, Table 6 demonstrates the cure rating at various points throughout both variations demonstrating less tack with radiation curing first. Cure ratings range from 1-5; 1 signifies an under cured surface that is fully imprinted by cotton tip and lacks mar resistance while 5 signifies a fully cured coating that is not easily imprinted by cotton tip nor easily marred by a wooden scraper.

TABLE 5

Properties of Example 3 (dual-cured in both possible orders) and the Comparative Example (thermal cure only)

| Formulation | Two-Part Cure Order | Feel Rank (5 = best) | Persoz | Pencil | Gloss | Bug spray Resistance |
|---|---|---|---|---|---|---|
| Comparative Example | N/A | 4 | 139 | 7B | 2.2 | Fail |
| Example 3 | UV-Bake | 4 | 74 | 5B | 1.3 | Pass |
| Example 3 | Bake-UV | 4 | 75 | 3B | 1.3 | Pass |

TABLE 6

Cure Rating and Persoz Hardness of Example 3 throughout dual cure process in both UV-bake and bake-UV order

| Example 3: UV Cure followed by Bake | | Example 3: Bake followed by UV Cure | |
|---|---|---|---|
| Cure Step | Cure Rating | Cure Step | Cure Rating |
| UV cure | 2 | Bake 30 min | 1 |
| Bake 15 min | 3 | Bake 45 min | 2 |
| Bake 45 min | 3 | Bake 1 hr | 2 |
| Bake 1 hr (final) | 4 Persoz: 30 | UV (x2) | 5 Persoz: 29 |
| Next Day | 5 Persoz: 55 | Next Day | 5 Persoz: 58 |

As can be seen from Tables 3-5, the dual curable compositions described herein exhibit increased durability and certain stain resistance properties while retaining the soft feel characteristics of the comparative Example.

The invention claimed is:

1. A coating composition comprised of at least one free radical-curable ethylenically unsaturated compound, at least one polyol and at least one polyisocyanate, wherein the at least one free radical-curable ethylenically unsaturated compound includes at least one isocyanurate tri(meth)acrylate or derivative thereof or at least one isocyanate functionality-containing urethane (meth)acrylate and the weight ratio of (polyol+polyisocyanate): free radical-curable ethylenically unsaturated compound is from 1:1 to 10:1.

2. The coating composition of claim 1, wherein the at least one free radical-curable ethylenically unsaturated compound includes the at least one isocyanurate tri(meth)acrylate or derivative thereof.

3. The coating composition of claim 1, wherein the at least one free radical-curable ethylenically unsaturated compound includes at least one urethane diacrylate.

4. The coating composition of claim 1, wherein the at least one free radical-curable ethylenically unsaturated compound includes the at least one isocyanurate tri(meth)acrylate or derivative thereof and further includes at least one urethane diacrylate.

5. The coating composition of claim 1, wherein the at least one free radical-curable ethylenically unsaturated compound includes the at least one isocyanate functionality-containing urethane acrylate.

6. The coating composition claim 1, wherein the at least one free radical-curable ethylenically unsaturated compound includes the at least one isocyanate-reactive functionality-containing urethane (meth)acrylate.

7. The coating composition of claim 1, further comprising at least one photoinitiator.

8. The coating composition of claim 1, further comprising at least one free radical initiator that decomposes when heated or in the presence of an accelerator.

9. The coating composition of claim 1, further comprising at least one matting agent.

10. The coating composition of claim 1, further comprising at least one non-reactive solvent.

11. The coating composition of claim 1, wherein the coating composition is free of non-reactive solvent.

12. The coating composition of claim 1, wherein the coating composition is water-borne.

13. The coating composition of claim 1, wherein the at least one polyol includes one or more polyols selected from the group consisting of polyester polyols, polyether polyols, polycarbonate polyols, polycarbonate polyester polyols, polyacrylic polyols, polyurethane polyols, polycaprolactone polyols, polyolefin polyols and combinations thereof.

14. The coating composition of claim 1, wherein the at least one polyisocyanate includes one or more polyisocyanates selected from the group consisting of aromatic polyisocyanates, aliphatic polyisocyanates and cycloaliphatic polyisocyanates.

15. The coating composition of claim 1, wherein the coating composition is comprised of at least one polyol, at least one polyisocyanate, at least one non-reactive solvent, at least one urethane diacrylate, at least one isocyanurate tri(meth)acrylate, at least one matting agent and at least one photoinitiator.

16. The coating composition of claim 1, wherein the coating composition is comprised of at least one polyol, at least one polyisocyanate, at least one non-reactive solvent, at least one isocyanate functionality-containing urethane acrylate, at least one matting agent and at least one photoinitiator.

17. The coating composition of claim 1, wherein the coating composition is packaged in the form of two separate parts as follows:
   a-1) a Part A-1 comprised of at least one free radical-curable ethylenically unsaturated compound and at least one polyisocyanate; and
   b-1) a Part B-1 comprised of at least one polyol; or
   a-2) a Part A-2 comprised of at least one free radical-curable ethylenically unsaturated compound and at least one polyol; and
   b-2) a Part B-2 comprised of at least one polyisocyanate.

18. A method of forming a coating on a surface of a substrate, comprising the steps of applying at least one layer of the coating composition of claim 1, to the surface of the substrate, exposing the coating composition to an amount of radiation and/or of heat effective to initiate cure of the at least one free radical-curable ethylenically unsaturated compound and reacting the at least one polyol and the at least one polyisocyanate.

19. The method of claim 18, wherein the coating composition is prepared by mixing a first part comprised of the at least one free radical-curable ethylenically unsaturated compound and the at least one polyol with a second part comprised of the at least one polyisocyanate or by mixing a first part comprised of the at least one polyol and a second part comprised of the at least one polyisocyanate and the at least one free radical-curable ethylenically unsaturated compound.

20. The method of claim 18, wherein the coating composition is heated after being applied to the surface of the substrate.

21. The method of claim 18, wherein the coating composition is heated after exposing the coating composition to the amount of radiation effective to initiate cure of the at least one free-radical curable ethylenically unsaturated compound.

22. The method of claim 18, wherein the coating composition is exposed to the amount of radiation effective to initiate cure of the at least one free-radical curable ethylenically unsaturated compound, after heating the coating composition.

23. A precursor composition useful for forming a coating composition as defined in claim 1, when said precursor composition is combined with at least one polyol, wherein the precursor composition is comprised of at least one free radical-curable ethylenically unsaturated compound and at least one polyisocyanate, said precursor composition being free of any polyol.

24. A precursor composition useful for forming a coating composition as defined in claim 1, when said precursor composition is combined with at least one polyisocyanate, wherein the precursor composition is comprised of at least one free radical-curable ethylenically unsaturated compound and at least one polyol, said precursor composition being free of any polyisocyanate.

25. A two part system useful for forming a coating composition as defined according to claim 1, comprising as separately packaged components, either:
   a-1) a Part A-1 comprised of at least one free radical-curable ethylenically unsaturated compound and at least one polyisocyanate; and
   b-1) a Part B-1 comprised of at least one polyol; or
   a-2) a Part A-2 comprised of at least one free radical-curable ethylenically unsaturated compound and at least one polyol; and
   b-2) a Part B-2 comprised of at least one polyisocyanate.

26. A method of making a coating, comprising combining Part A-1 and Part B-1 of claim 25 or combining Part A-2 and Part B-2 of claim 25 to form a coating composition, applying the coating composition to a surface of a substrate and curing the applied coating composition.

27. A coating comprised of at least one layer of a coating composition in accordance with claim 1, wherein the coating composition is cured.

28. An article of manufacture comprised of a substrate, wherein a surface of the substrate is at least partially coated with a coating composition in accordance with claim 1.

29. The article of manufacture of claim 28, wherein the surface of the substrate is comprised of at least one material selected from the group consisting of thermosets, thermoplastics, metals, wood, leather, glass, paper, cardboard and combinations thereof.

30. A coating composition comprised of at least one free radical-curable ethylenically unsaturated compound, at least one polyol, at least one polyisocyanate, and at least one matting agent, wherein the at least one free radical-curable ethylenically unsaturated compound includes at least one isocyanurate tri(meth)acrylate or derivative thereof or at least one isocyanate functionality-containing urethane (meth)acrylate and the weight ratio of (polyol+polyisocyanate): free radical-curable ethylenically unsaturated compound is from 1:1 to 10:1, and wherein the coating composition is packaged in the form of two separate parts as follows:
   a-1) a Part A-1 comprised of at least one free radical-curable ethylenically unsaturated compound and at least one polyisocyanate; and
   b-1) a Part B-1 comprised of at least one polyol; or a-2) a Part A-2 comprised of at least one free radical-curable ethylenically unsaturated compound and at least one polyol; and b-2) a Part B-2 comprised of at least one polyisocyanate.

\* \* \* \* \*